(12) United States Patent
Duek (10) Patent No.: US 11,559,858 B2
(45) Date of Patent: Jan. 24, 2023

(54) SYSTEM AND METHOD FOR CREATION OF A PREDETERMINED STRUCTURE FROM A DIAMOND BULK

(71) Applicant: DIAMTECH LTD., Ramat-Gan (IL)

(72) Inventor: Dotan Duek, Ramat-Gan (IL)

(73) Assignee: DIAMTECH LTD., Ramat-Gan (IL)

( * ) Notice: Subject to any disclaimer, the term of this patent is extended or adjusted under 35 U.S.C. 154(b) by 355 days.

(21) Appl. No.: 16/640,357

(22) PCT Filed: Aug. 19, 2018

(86) PCT No.: PCT/IL2018/050912
§ 371 (c)(1),
(2) Date: Feb. 20, 2020

(87) PCT Pub. No.: WO2019/038754
PCT Pub. Date: Feb. 28, 2019

(65) Prior Publication Data
US 2020/0171607 A1    Jun. 4, 2020

Related U.S. Application Data

(60) Provisional application No. 62/548,416, filed on Aug. 22, 2017.

(51) Int. Cl.
*B23K 26/53* (2014.01)
*A44C 17/00* (2006.01)
(Continued)

(52) U.S. Cl.
CPC ............ *B23K 26/53* (2015.10); *A44C 17/001* (2013.01); *B28D 1/221* (2013.01); *B23K 2103/50* (2018.08)

(58) Field of Classification Search
CPC .... B23K 26/53; B23K 2103/50; B23K 26/38; A44C 17/001; B28D 1/221
See application file for complete search history.

(56) References Cited

U.S. PATENT DOCUMENTS

| | | | |
|---|---|---|---|
| 5,410,125 A * | 4/1995 | Winston | B41M 5/24 219/121.73 |
| 8,098,368 B2 * | 1/2012 | Shlezinger | G01N 21/87 356/30 |

(Continued)

FOREIGN PATENT DOCUMENTS

| | | |
|---|---|---|
| GB | 2540537 | 1/2017 |
| JP | H0740336 A | 2/1995 |

(Continued)

OTHER PUBLICATIONS

Extended European Search Report for EP Application No. 18848043.8 dated May 10, 2021.

(Continued)

*Primary Examiner* — John P. Dulka
(74) *Attorney, Agent, or Firm* — The Roy Gross Law Firm, LLC; Roy Gross (57) ABSTRACT

Aspects of the invention may be directed to a method of creating a predetermined structure from a diamond bulk. In some embodiments, the method may include: irradiating the diamond bulk with at least one laser having a focal point at a predetermined location, the laser may create graphitization at locations where the focal point of the laser engages the diamond bulk; at least one of: moving the diamond bulk to be positioned with the focal point of the laser within the diamond bulk, and moving the at least one laser such that diamond bulk be positioned with the focal point of the laser, along at least one axis wherein the movement corresponds to a predefined scheme; removing of the graphite from the diamond bulk; and extracting the predetermined structure from the diamond bulk.

15 Claims, 4 Drawing Sheets

(51) Int. Cl.
B28D 1/22 (2006.01)
B23K 103/00 (2006.01)

(56) References Cited

U.S. PATENT DOCUMENTS

| | | | |
|---|---|---|---|
| 2012/0240622 A1 | 9/2012 | Sorenson | |
| 2013/0192579 A1 | 8/2013 | Linares et al. | |
| 2014/0312017 A1* | 10/2014 | Potemkin | C04B 41/0036 219/121.76 |
| 2015/0121960 A1* | 5/2015 | Hosseini | B23K 26/53 65/29.11 |
| 2020/0164469 A1* | 5/2020 | Bassett | B23K 26/0622 |

FOREIGN PATENT DOCUMENTS

| | | |
|---|---|---|
| JP | 2005294413 | 10/2005 |
| JP | 2007069216 A | 3/2007 |
| JP | 2016113333 | 6/2016 |
| WO | WO 97/25177 | 7/1997 |
| WO | WO2012/007956 | 1/2012 |
| WO | WO 2012/007956 | 1/2012 |
| WO | 2016112596 A1 | 7/2016 |
| WO | 2016168796 A1 | 10/2016 |

OTHER PUBLICATIONS

International Search Report of Application No. PCT/IL2018/050912 dated Nov. 26, 2018.
Precise Laser Processing for Diamond, You Qing, Foreign No. 12, 1994, pp. 31 33, Dec. 31, 1994.
Fabrication Technologies of Natural Diamond Tools, Sun Tao et al., pp. 44 46, Harbin Institute of Technology Press, May 2013.
Office Action of Chinese Invention Patent Application No. 2018800600257 dated Aug. 26, 2022.
Office Action of Japanese Patent Application No. 2020-531833 dated Jul. 5, 2022.
Office Action of European Patent Application No. 18848043.8 dated Apr. 13, 2022.

* cited by examiner

SYSTEM AND METHOD FOR CREATION OF A PREDETERMINED STRUCTURE FROM A DIAMOND BULK

CROSS-REFERENCE TO RELATED APPLICATIONS

This application is a National Phase Application of PCT International Application No. PCT/IL2018/050912, International Filing Date Aug. 19, 2018, claiming the benefit of U.S. Provisional Patent Application No. 62/548,416, filed Aug. 22, 2017 which is hereby incorporated by reference.

FIELD OF THE INVENTION

The present invention generally relates to diamond cutting and/or shaping. More particularly, the present invention relates to systems and methods for creating one or more predefined structures from a diamond bulk.

BACKGROUND OF THE INVENTION

In recent years, diamond shaping processes have become more common as natural and/or artificially grown diamonds are used in many different industries. Diamonds are used for gems, medical devices, optical devices, mechanical devices and other devices, for different purposes and utilities.

Usually diamond shaping includes multiple steps which require a human intervention for preparation intervals between the steps. Sometimes, multiple polishing steps are still carried out manually in order to achieve the desired product. A typical polishing process can include, laser cutting, manual shaping, and manual polishing.

SUMMARY OF THE INVENTION

Some aspects of the invention may be directed to a method of creating a predetermined structure from a diamond bulk. In some embodiments, the method may include: irradiating the diamond bulk with at least one laser having a focal point at a predetermined location, the laser may create graphitization at locations where the focal point of the laser engages the diamond bulk; at least one of: moving the diamond bulk to be positioned with the focal point of the laser within the diamond bulk, and moving the at least one laser such that diamond bulk be positioned with the focal point of the laser, along at least one axis wherein the movement corresponds to a predefined scheme; removing of the graphite from the diamond bulk; and extracting the predetermined structure from the diamond bulk. In some embodiments, the at least one laser may be at least one of ultrafast laser and ultra-violet laser.

In some embodiments, the laser may emit light having pulses of less than 200 nanosecond seconds. In some embodiments, irradiating the diamond bulk is with two or more lasers. In some embodiments, the two or more lasers may include at least a first laser and a second laser different from one another. In some embodiments, the laser may emit light having pulses in the range of 1 nanosecond to 10 femtoseconds. In some embodiments, the laser may emit light having a wavelength of 278 nm to 1500 nm. In some embodiments, the method may further include automatically moving the diamond bulk with a controllable platform. In some embodiments, the method may further include moving the diamond bulk along at least two axes to create a three-dimensional structure.

In some embodiments, the method may further include extracting at least two predetermined structures from the diamond bulk. In some embodiments, the method may further include removing of the graphite from the diamond bulk using oxidation. In some embodiments, the method may further include polishing surface in the diamond bulk for passage of the laser beams therethrough. In some embodiments, the method may further include immersing the diamond bulk in a liquid having a refractive index corresponding to the refractive index of the diamond bulk. In some embodiments, the method may further include engaging the diamond bulk with a crystal having a refractive index corresponding to the refractive index of the diamond bulk.

Some aspects of the invention may be directed to a system for creation of predetermined structure from a diamond bulk, the system may include: at least one laser, each configured to emit light with a focal point at a predetermined location; a movable platform, configured to hold the diamond bulk to allow the focal point to be positioned within the diamond bulk, and wherein the platform is configured to move along at least one axis; and a processor, configured to move at least one of: the movable platform and each of the focal points, in accordance with a predefined scheme. In some embodiments, the at least one laser is at least one of: ultrafast laser and ultra-violet laser.

In some embodiments, the system may further include two or more lasers. In some embodiments, the two or more lasers include at least a first laser and at least a second laser different from one another.

In some embodiments, the processor may be configured to operate the at least one laser. In some embodiments, the at least one laser is movable relative to the movable platform. In some embodiments, the light may be emitted with pulses of at least 10 femtoseconds. In some embodiments, the wavelength of the emitted light may be 157-1500 nanometers. In some embodiments, the platform may be configured to move the diamond bulk along at least two axes to create a three-dimensional structure. In some embodiments, the emitted light from the at least one laser may create graphitization at locations where the focal point of the laser irradiates the diamond bulk, and wherein the platform is configured to move the diamond bulk to remove the graphite. In some embodiments, the platform may be configured to move the diamond bulk to etch the graphite in an oxidation container.

In some embodiments, the diamond bulk comprises an artificially grown diamond. In some embodiments, the predefined scheme has an amorphic shape. In some embodiments, the diamond bulk comprises a polished surface for passage of laser beams therethrough.

Some additional aspects of the invention may be related to a system for creation of predetermined structure from a diamond bulk, the system may include: at least one movable laser, configured to emit light with a focal point at a predetermined location, wherein the at least one ultrashort movable laser is configured to move along at least one first axis; a platform, configured to hold the diamond bulk to allow the focal point to be positioned within the diamond bulk; and a processor, configured to move the movable laser in accordance with a predefined scheme. In some embodiments, the processor may be configured to move the platform along at least one second axis.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
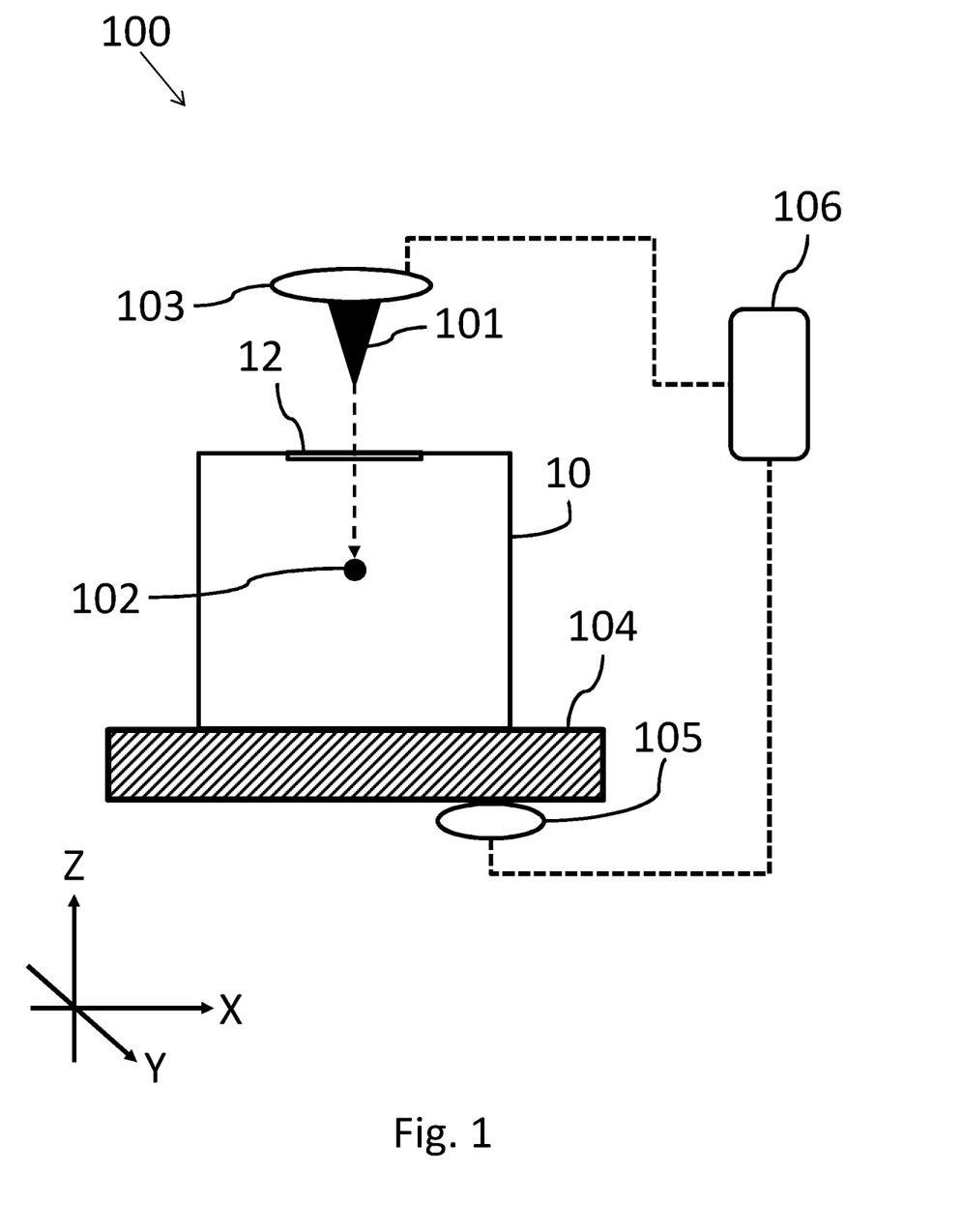
FIG. 1 schematically illustrates a diamond shaping system according to some embodiments of the invention.

Reference is now made to FIG. 1, which schematically illustrates a diamond shaping system 100, according to some embodiments of the invention. Diamond shaping system 100 may allow automatic creation of a predetermined structure from a diamond bulk 10 in a minimal amount of time (e.g., ~30 minutes), in contrast to previously known methods of multiple step diamond polishing that required several days of work. In some embodiments, diamond bulk 10 includes at least one of natural and/or artificially grown diamond.

Diamond shaping system 100 may include at least one source of focused light, such as a laser 101, that may be configured to emit light (shown with a dashed line in FIG. 1) with a focal point at a predetermined location 102. In some embodiments, a laser 101 may be at least one of ultrafast laser and/or excimer (or ultra-violet) laser (with wavelength of the emitted light in the range 157-1500 nanometers), for instance having a frequency of less than 200 nanoseconds. In some embodiments, the light beams may be emitted form laser 101 in pulses of at least 10 femtoseconds, for example, in the range of 1 nanosecond to 10 femtoseconds. In some embodiments, diamond shaping system 100 may include two or more lasers 101. In some embodiments, the two or more lasers may include at least a first laser 101 (e.g., CW 532 laser) and a second laser 101 (e.g., 1064 nm pulsed laser) different from one another.

In some embodiments, the at least one laser 101 is movable and may be coupled to at least one alignment mechanism 103 (e.g., using mechanical bearings and/or a galvanometer system) configured to move the at least one source of focused light 101 such that the location of the focal point 102 may move. In some embodiments, at least one source of focused light 101 may be configured to move along at least two axes 'X' and 'Z' to form a three-dimensional cut in diamond bulk 10 and thereby shape a three-dimensional predetermined structure therefrom. In some embodiments, at least one laser 101 may be configured to move by rotating and/or tilting the at least one source of focused light 101 and thereby allow additional alignment of focal point 102 within diamond bulk 10.

Diamond shaping system 100 may further include a movable platform 104 configured to hold the diamond bulk 10 and allow the focal point 102 to be positioned within the diamond bulk 10. In some embodiments, the platform 104 may be configured to move along at least one axis. In some embodiments, a surface 12 of diamond bulk 10 (e.g., the surface facing the at least one source of focused light 101) may be pre-processed and/or polished in order to allow passage of light beams therethrough. Such polished surface 12 may form a window to allow passage of light beams from at least one laser 101 to full inner structure of diamond bulk 10.

In some embodiments, diamond bulk 10 may be immersed in a liquid and/or molten material having a refractive index corresponding to the refractive index (e.g., between 2.32-2.55) of the diamond bulk 10 in order to allow passage of light beams therethrough. In some embodiments, the diamond bulk 10 may be engaged with a crystal having a refractive index corresponding to the refractive index (e.g., between 2.32-2.55) of the diamond bulk in order to allow passage of light beams therethrough.

In some embodiments, the diamond bulk 10 may be irradiated with at least one laser 101 to create graphitization at locations where the focal point 102 engages within the diamond bulk 10. Once such portions of graphitization are removed, as further described hereinafter, a predetermined structure may be separated from diamond bulk 10. In some embodiments, the platform 104 may be configured to move the diamond bulk to remove the graphite.

In some embodiments, platform 104 is movable and may be coupled to at least one movement mechanism 105 (e.g., using mechanical bearings) configured to move the diamond bulk 10. In some embodiments, platform 104 may be configured to move along at least one axis 'Z'. In some embodiments, platform 104 may be configured to move along at least two axes 'X' and 'Z' to form a multi-dimensional cut in diamond bulk 10 and thereby shape a three-dimensional predetermined structure therefrom. In some embodiments, platform 104 may be configured to move by rotating and/or tilting platform 104 and thereby allow additional alignment of focal point 102 within diamond bulk 10.

Diamond shaping system 100 may include a processor 106, configured to move at least one of: the movable platform 104 and each of the focal points 102, in accordance with a predefined scheme. The processor 106 may be coupled to alignment mechanism 103 and/or coupled to movement mechanism 105 such that processor 106 may control movement of the at least one source of focused light 101 and/or control movement of platform 104 in accordance with a predefined scheme (e.g., received by the user). Thus, processor 106 may move the diamond bulk along at least one axis 'Z' to be positioned with the focal point 102 of the at least one source of focused light 101 within the diamond bulk 10, where the movement may correspond to the predefined scheme. According to some embodiments, processor 106 may control operation of the at least one laser 101, for instance control at least one of frequency and intensity of the emitted focused light beams.

According to some embodiments, portions of graphitization may be removed from diamond bulk 10 using oxidation (e.g., etching in an oxidation container) so as to allow extraction of the predetermined structure from the diamond bulk 10. In some embodiments, the platform 104 may be configured to move the diamond bulk to etch the graphite in an oxidation container. In some embodiments, the entire automated process of shaping and extracting the predetermined structure from the diamond bulk 10 may occur in less than an hour. In some embodiments, at least two predetermined structures may be extracted from the diamond bulk 10, as illustrated and discussed with respect to FIGS. 4A-4D.

In some embodiments, about 90% of shaping the predetermined structure from the diamond bulk 10 may be carried out in a single step. For example, the user may provide to processor 106 the predefined scheme for the predetermined structure such that processor 106 may automatically move platform 104 and/or at least one source of focused light 101 in accordance with the predefined scheme until the predetermined structure is separated from the diamond bulk 10 with portions of graphitization and once these portions are removed the predetermined structure may be extracted from the diamond bulk, e.g., by etching in an oxidation container.

It should be noted that while previously known processes usually remove extra diamond material by polishing the unwanted material from the bulk to turn it into diamond dust for which there is no use, the diamond shaping system 100 may allow extracting the polished diamond from the rough diamond bulk using precise laser irradiation (e.g., ultrafast lasers below 1000 picoseconds). Thus, losses of diamond material may be prevented and that material may be used elsewhere (e.g., further polished to create additional diamonds).

In some embodiments, the predetermined structure (to be extracted from the diamond bulk) may include an amorphous shape to be automatically polished using diamond shaping system 100. Thus, almost any shape (e.g., diamond undercuts) may be created from the diamond bulk 10, that was not previously possible using multiple step polishing methods that required manual polishing.

Figure 2A:
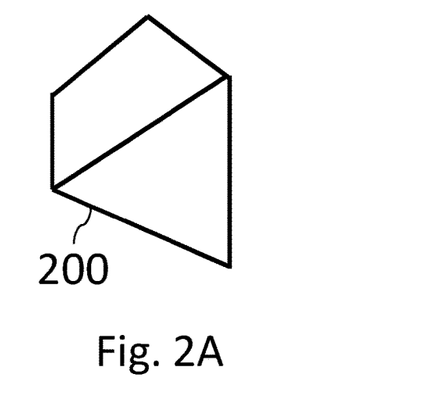
FIG. 2A schematically illustrates a predefined diamond scheme according to some embodiments of the invention.

Reference is now made to FIG. 2A, which schematically illustrates a predefined diamond scheme 200, according to some embodiments of the invention. A user may provide predefined diamond scheme 200 to processor 106 (shown in FIG. 1), with instructions to cut and/or shape diamond bulk 10 (e.g., using an ultrafast laser) in order to extract a three-dimensional structure predefined by diamond scheme 200 therefrom.

Figure 2B:
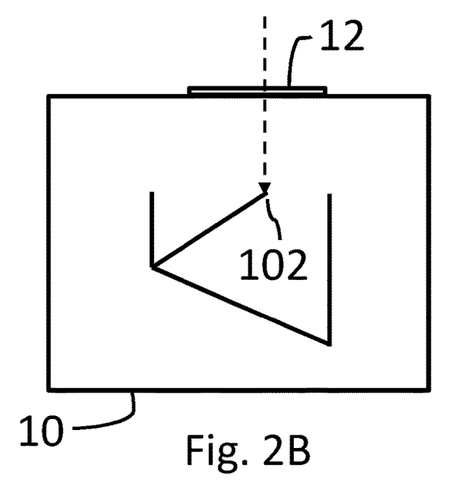
FIG. 2B schematically illustrates a cross-sectional view of a portion of the predefined diamond scheme cut in the diamond bulk according to some embodiments of the invention.

Reference is now made to FIG. 2B, which schematically illustrates a cross-sectional view of a portion of the predefined diamond scheme 200 cut in the diamond bulk 10, according to some embodiments of the invention. At least one laser 101 (e.g., an ultrafast laser) may emit light beams to pass into diamond bulk 10 with focal point 102 moving according to the predefined scheme 200 such that graphitization is created at locations where the focal point 102 engages the diamond bulk 10. The movement of focal point 102 may be caused by movement of platform 104 (shown in FIG. 1) and/or movement of laser 101 that may move, for example, in at least two axes, in accordance with predefined scheme 200 in order to create a three-dimensional structure. In some embodiments, diamond bulk 10 may be cut from the bottom and towards the top (e.g., towards the source of focused light 101) as shown in FIG. 2B, where only a portion is cut within diamond bulk 10.

According to some embodiments, diamond bulk 10 may be cut in separate layers (or planes) in accordance with the predefined scheme 200. In some embodiments, once the process of cutting a layer is complete, the location of focal point 102 may shift (e.g., due to movement of source of focused light 101 and/or platform 104) up between 25 nanometers to 0.15 millimeters such that another layer may be shaped. Thus, the layer cutting process (e.g., starting from bottom of diamond bulk 10) may be repeated until the top surface 12 level is reached.

Figure 2C:
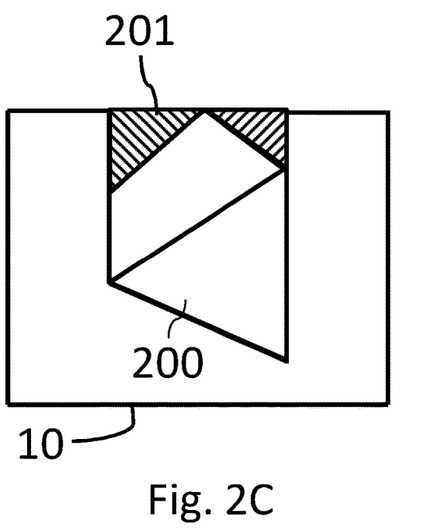
FIG. 2C schematically illustrates a cross-sectional view of the predefined diamond scheme cut in the diamond bulk according to some embodiments of the invention.

Reference is now made to FIG. 2C, which schematically illustrates a cross-sectional view of the predefined diamond scheme 200 cut in the diamond bulk 10, according to some embodiments of the invention. Once all layer cutting procedure is completed to create graphitization at desired locations, for instance after completion of source of focused light 101 operation with focal point 102 passing through all locations to be cut within diamond bulk 10, the graphitization portions may be removed by etching and/or oxidation (e.g., within an oxidation chamber). In some embodiments, the shape of predefined diamond scheme 200 may leave at least one interface portion 201 of diamond bulk 10 that is not included in predefined scheme 200 while included in the block to be extracted together with predefined scheme 200. Such interface portions 201 may be automatically cut similarly to shaping of predefined scheme 200 using the source of focused light 101.

Figure 2D:
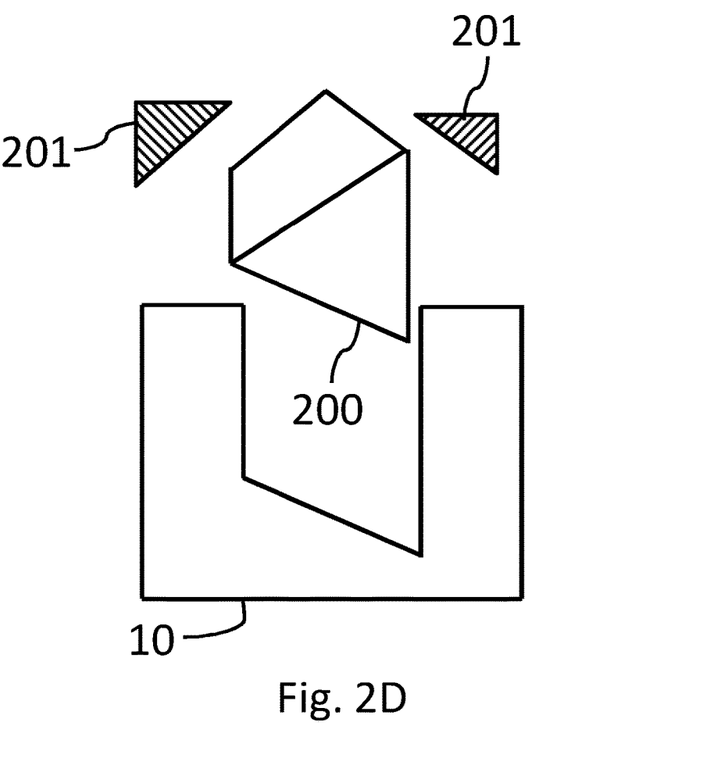
FIG. 2D schematically illustrates a cross-sectional view of the predefined diamond scheme extracted from the diamond bulk according to some embodiments of the invention.

Reference is now made to FIG. 2D, which schematically illustrates a cross-sectional view of the predefined diamond scheme 200 extracted from the diamond bulk 10, according to some embodiments of the invention. Once all cutting procedures are completed, diamond bulk may be etched (e.g., within an oxidation container) in order to remove the graphitization portions and thereby extract the predefined scheme 200 and interface portions 201 from diamond bulk 10. In some embodiments, interface portions 201 may be removed from predefined scheme 200 using high temperature in an oxygen environment. In some embodiments, the removed interface portions 201 may be reused and further processed and shaped with the processes and systems described above.

Figure 3:
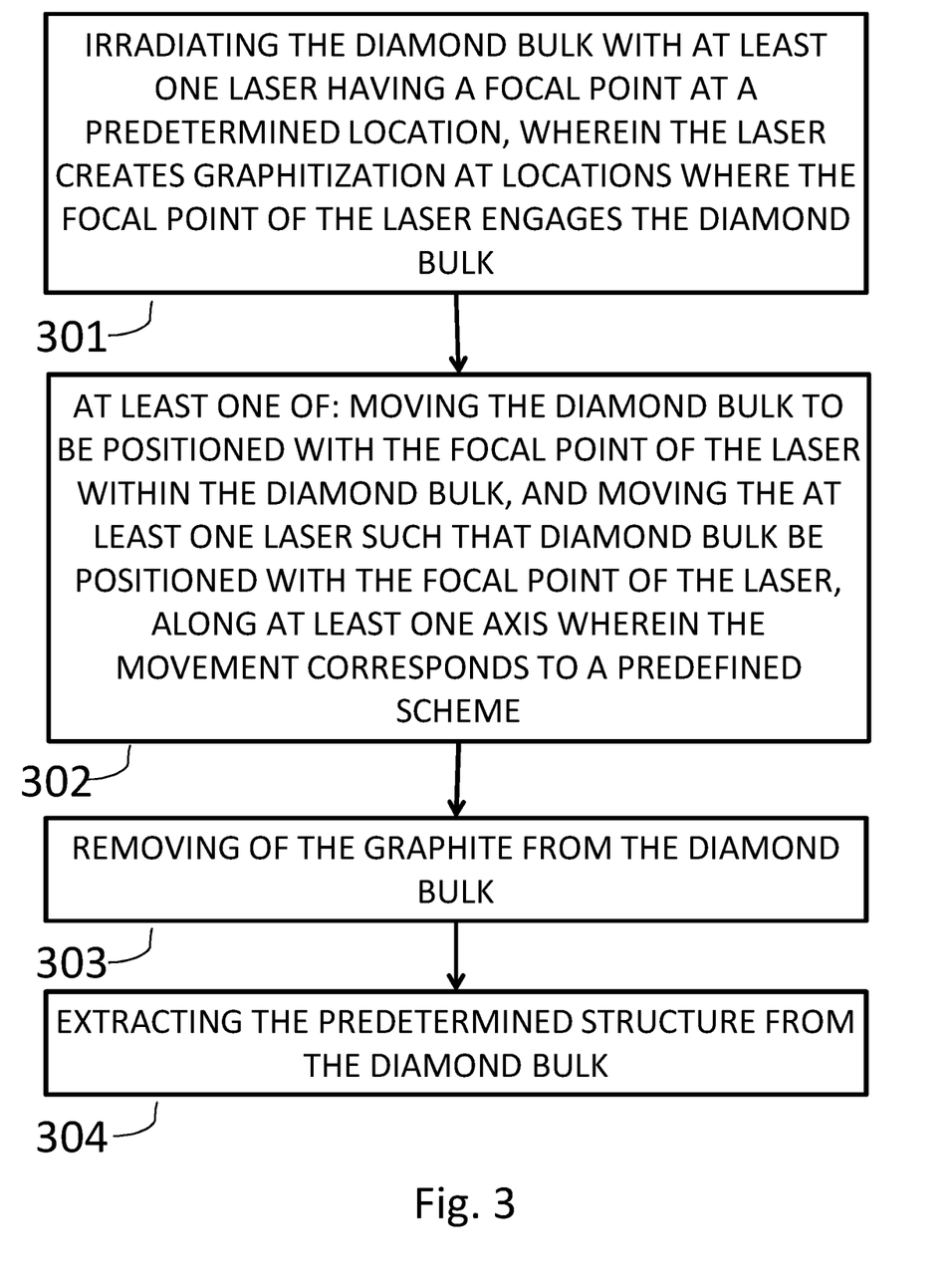
FIG. 3 shows a flowchart for a method of creating a predefined structure from a diamond bulk according to some embodiments of the invention.

FIG. 3 shows a flowchart for a method of creating a predefined structure from a diamond bulk, according to some embodiments of the invention. The method of FIG. 3 may be performed by system 100 illustrated in FIG. 1. In some embodiments, the diamond bulk 10 may be irradiated, in step 301, with at least one laser 101 having a focal point 102 at a predetermined location. In some embodiments, the laser 101 may create graphitization at locations where the focal point 102 of the laser 101 engages the diamond bulk 10. According to some embodiments, the laser 101 may be at least one of ultrafast laser and excimer laser. In some embodiments, irradiating the diamond bulk may be with two or more lasers, for example, at least a first laser (e.g., CW 532 laser) and a second laser (e.g., 1064 nm pulsed laser) different from one another. In some embodiments, the laser 101 may emit light having pulses of less than 200 nanosecond seconds. In some embodiments, the laser 101 may emit light having pulses in the range of 1 nanosecond to 10 femtoseconds. In some embodiments, the laser 101 may emit light having a wavelength of 278 nm to 1500 nm.

In step, 302, at least one of: the diamond bulk may be moved to be positioned with the focal point of the laser within the diamond bulk, and the at least one laser may be moved such that diamond bulk may be positioned with the focal point of the laser, along at least one axis. According to some embodiments, the movement may correspond to a predefined scheme 200. In some embodiments, moving the diamond bulk may be along at least two axes to create a three-dimensional structure, for example, based on the scheme 200.

In some embodiments, the method may further include immersing the diamond bulk 10 in a liquid having a refractive index corresponding to the refractive index of the diamond bulk, as disused herein above. In some embodiments, the method may further include engaging the diamond bulk 10 with a crystal having a refractive index corresponding to the refractive index of the diamond bulk, as discussed herein above.

In some embodiments, the graphite may be removed, in step 303, from the diamond bulk 10. In some embodiments, the graphite may be removed using oxidation. In some embodiments, the predetermined structure may be extracted, in step 304, from the diamond bulk 10. In some embodiments, at least two predetermined structures may be extracted from the diamond bulk 10, for example, when the predefined scheme includes two or predetermined structures, as illustrated and discussed with respect to FIGS. 4A-4D.

In some embodiments, the method may further include polishing surface in the diamond bulk for passage of the laser beams therethrough, for example, using any diamond polishing method known in the art.

Figure 4A:
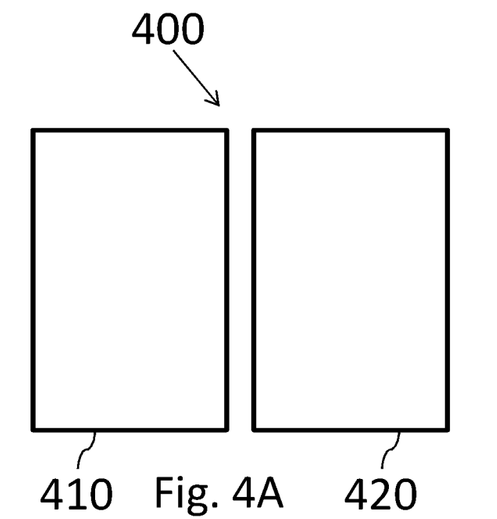
FIG. 4A schematically illustrates a predefined diamond cut scheme, according to some embodiments of the invention.

FIG. 4A schematically illustrates a predefined diamond cut scheme, according to some embodiments of the invention. A user may provide predefined diamond cut scheme 400 to processor 106 (shown in FIG. 1), with instructions to cut and/or shape diamond bulk 10 (e.g., using an ultrafast laser) in order to extract at least two diamond shapes 410, 420. In some embodiments, diamond bulk 10 may be shaped with a thin cut method with less than 0.05% loss in weight of diamond and less than 5 micrometers cut thickness. It should be noted that previous systems were able to cut diamond bulks (e.g., using waterjets) with thickness of about 50 micrometers which generates loss of about 0.5% in weight.

Figure 4B:
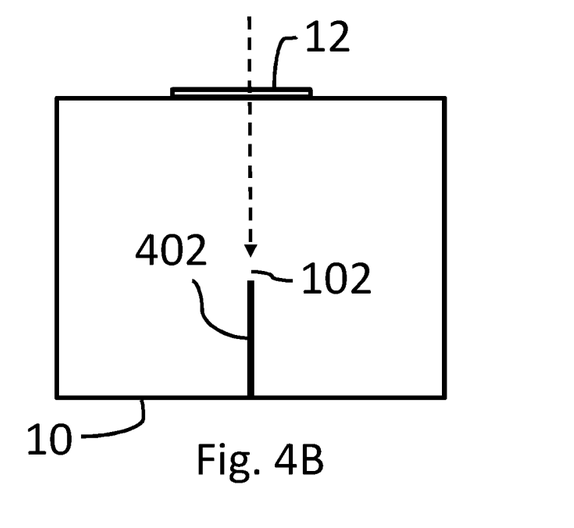
FIG. 4B schematically illustrates a cross-sectional frontal view of a portion of the predefined diamond cut scheme cut in the diamond bulk according to some embodiments of the invention.

FIG. 4B schematically illustrates a cross-sectional frontal view of a portion of the predefined diamond cut scheme cut in the diamond bulk, according to some embodiments of the invention. At least one source of focused light 101 (e.g., an ultrafast laser) may emit light beams to pass into diamond bulk 10 with focal point 102 moving according to the predefined cut scheme 400 such that graphitization may be created at locations where the focal point 102 engages the diamond bulk 10. For example, for a predefined cut scheme 400 with single plane cut, the focal point 102 may move along the plane to create graphitization along the cut plane and thereby separate by the graphitized plane at least two portions of diamond block 10. It should be noted that such laser cutting may keep a sufficiently narrow cutting line (e.g., less than 5 micrometers cut thickness) such that cone shaped cutting with previously known methods that cause loss of diamond material may be avoided.

The movement of focal point 102 may be caused by movement of platform 104 (shown in FIG. 1) and/or movement of the source of focused light 101 that may move in accordance with predefined cut scheme 400. In some embodiments, diamond bulk 10 may be cut from the bottom and towards the top (e.g., towards the source of focused light 101) as shown in FIG. 4B, where only a portion is cut within diamond bulk 10 to form a graphitized plane 402 (only the side of the graphitized plane 402 is shown in FIG. 4B).

Figure 4C:
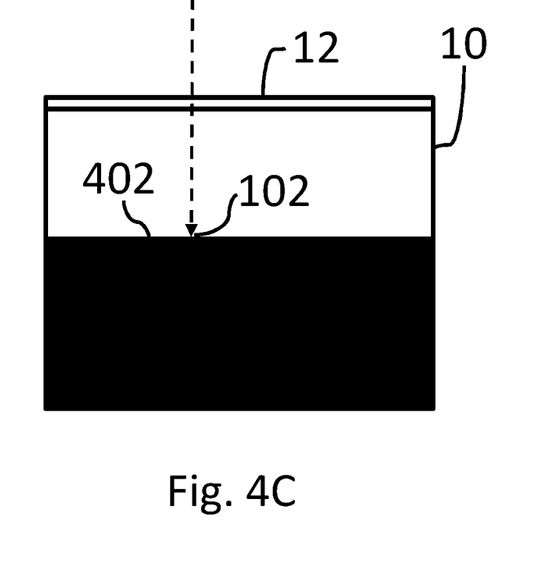
FIG. 4C schematically illustrates a cross-sectional side view of a portion of the predefined diamond cut scheme cut in the diamond bulk according to some embodiments of the invention.

FIG. 4C schematically illustrates a cross-sectional side view of a portion of the predefined diamond cut scheme cut in the diamond bulk, according to some embodiments of the invention. According to some embodiments, diamond bulk 10 may be cut in separate layers (or planes) in accordance with the predefined cut scheme 400. In some embodiments, the cutting process (e.g., starting from bottom of diamond bulk 10) may be repeated until the top surface 12 level is reached with movement of focal point 102 along the predefined planes of cut scheme 400 in order to separate at least two diamond shapes 410, 420 from diamond bulk 10. In some embodiments, movement of focal point 102 to create the graphitized plane 402 may be caused by movement of platform 104 and/or movement of the source of focused light 101. In some embodiments, focal point 102 may be moved from side to side of diamond bulk 10 for each level to create graphitized plane 402, until the graphitized plane 402 reaches the top surface 12 level.

Figure 4D:
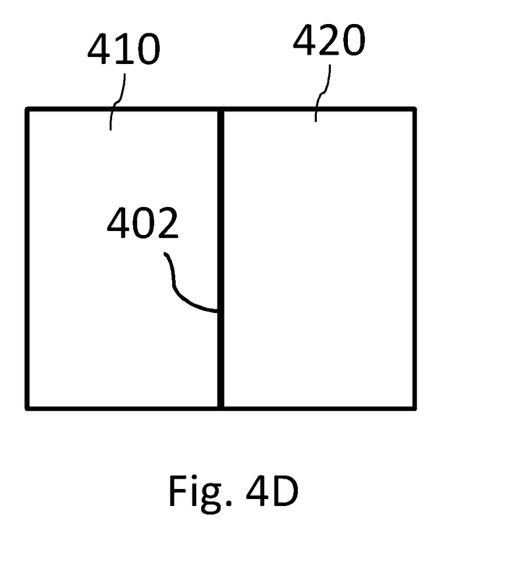
FIG. 4D schematically illustrates a cross-sectional view of the predefined diamond cut scheme cut in the diamond bulk according to some embodiments of the invention.

FIG. 4D schematically illustrates a cross-sectional view of the predefined diamond cut scheme cut in the diamond bulk, according to some embodiments of the invention. Once all cutting procedures are completed, diamond bulk 10 may be etched (e.g., within an oxidation container) in order to remove the graphitized plane 402 and thereby extract the predefined cut scheme 400 from diamond bulk 10. For example, in order to cut a diamond bulk 10 into two portions 410, 420, the focal point my move along the cutting plane from the bottom of diamond bulk 10 and until the top of surface 12 is reached to form graphitization in the cutting plane 402 such that after removal of the graphitization (e.g., with etching), the two portions 410, 420 may be separated from the diamond bulk 10.

Unless explicitly stated, the method embodiments described herein are not constrained to a particular order in time or chronological sequence. Additionally, some of the described method elements can be skipped, or they can be repeated, during a sequence of operations of a method or can occur or be performed simultaneously, at the same point in time, or concurrently.

Various embodiments have been presented. Each of these embodiments may of course include features from other embodiments presented, and embodiments not specifically described may include various features described herein.

The invention claimed is:
1. A method of creating a predetermined 3D structure inside a diamond bulk, the method comprising:
irradiating the diamond bulk with at least one laser having a focal point at a plurality of locations within the diamond bulk, wherein the laser creates graphitization at each location within the diamond bulk where the focal point of the laser engages the diamond bulk;

forming at least two graphitized layers of the 3D structure inside the diamond bulk by moving the focal point of the least one laser inside the diamond bulk by at least one of:

moving the diamond bulk with respect to the laser and moving the at least one laser with respect to the diamond bulk, along at least two axes, such that the focal point of the laser is maintained within the diamond bulk and wherein the movement of the diamond bulk and/or the least one laser corresponds to a scheme of the 3D structure;

removing graphite of the at least two graphitized layers from the diamond bulk; and extracting the predetermined structure from the diamond bulk.

2. The method of claim 1, wherein the at least one laser is at least one of ultrafast laser and ultra-violet laser.

3. The method of claim 1, wherein the at least one laser emits light having pulses of less than 200 nanosecond.

4. The method of claim 1 further comprising: removing the graphite from the diamond bulk by using oxidation.

5. The method of claim 1, further comprising polishing an external surface on the diamond bulk for passage of the laser beams therethrough.

6. The method of claim 1, further comprising immersing the diamond bulk in a liquid having a refractive index corresponding to the refractive index of the diamond bulk.

7. The method of claim 1, further comprising engaging the diamond bulk with a crystal having a refractive index corresponding to the refractive index of the diamond bulk.

8. A system for creation of predetermined 3D structure from inside a diamond bulk, the system comprising:

at least one laser, each configured to emit light with a focal point at a predetermined location within the diamond bulk;

a movable platform, configured to hold the diamond bulk to allow the focal point to be positioned within the diamond bulk, and wherein the platform is configured to move along at least two axes; and a processor, configured to:

control the at least one laser to irradiate the diamond bulk at a plurality of locations within the diamond bulk, wherein the laser creates graphitization at each locations within the diamond bulk where the focal point of the laser engages the diamond bulk;

form at least two graphitized layers of the 3D structure inside the diamond bulk by controlling the movable platform to move the focal point of the least one laser inside the diamond bulk by at least one of: moving the diamond bulk with respect to the laser and moving the at least one laser with respect to the diamond bulk, along the at least two axes, such that the focal point of the laser is maintained within the diamond bulk, and wherein the movement corresponds to a scheme of the 3D structure.

9. The system of claim 8, wherein the at least one laser is at least one of: ultrafast laser and ultra-violet laser.

10. The system of claim 8, wherein the processor is configured to operate the at least one laser.

11. The system of claim 8, wherein the at least one laser is movable relative to the movable platform.

12. The system of claim 8, wherein the light is emitted with pulses of at least 10 femtoseconds.

13. The system of claim 8, wherein the wavelength of the emitted light is, 157-1500 nanometres.

14. The system of claim 8, wherein the predefined scheme has an amorphic shape.

15. The system of claim 8, wherein the diamond bulk comprises a polished surface for passage of laser beams therethrough.

* * * * *